United States Patent
Dong et al.

(10) Patent No.: US 12,312,989 B2
(45) Date of Patent: May 27, 2025

(54) METHOD FOR PRODUCING GASOLINE PARTICULATE FILTER

(71) Applicant: JOHNSON MATTHEY (SHANGHAI) CHEMICAL LIMITED, Shanghai (CN)

(72) Inventors: Wenjie Dong, Shanghai (CN); Hongyu Ji, Shanghai (CN); Dongsheng Qiao, Shanghai (CN); Zhou Shang, Shanghai (CN); Guangyong Xiong, Shanghai (CN)

(73) Assignee: Johnson Matthey (Shanghai) Chemicals Limited, Shanghai (CN)

( * ) Notice: Subject to any disclaimer, the term of this patent is extended or adjusted under 35 U.S.C. 154(b) by 0 days.

(21) Appl. No.: 18/002,878

(22) PCT Filed: Jan. 25, 2022

(86) PCT No.: PCT/CN2022/073749
§ 371 (c)(1),
(2) Date: Dec. 22, 2022

(87) PCT Pub. No.: WO2023/141757
PCT Pub. Date: Aug. 3, 2023

(65) Prior Publication Data
US 2024/0102410 A1    Mar. 28, 2024

(51) Int. Cl.
*F01N 3/28* (2006.01)
*B01D 53/94* (2006.01)
*F01N 3/035* (2006.01)

(52) U.S. Cl.
CPC ........... *F01N 3/2803* (2013.01); *B01D 53/94* (2013.01); *F01N 3/035* (2013.01); *B01D 2255/1021* (2013.01); *B01D 2255/1025* (2013.01); *B01D 2255/908* (2013.01); *B01D 2255/915* (2013.01); *B01D 2258/01* (2013.01); *F01N 2330/04* (2013.01)

(58) Field of Classification Search
CPC .... F01N 3/2803; F01N 3/035; F01N 2330/04; F01N 3/0222; B01D 53/94; B01D 2255/1021; B01D 2255/1025; B01D 2255/908; B01D 2255/915; B01D 2258/01; B01D 2255/1023; B01D 2255/2042; B01D 2255/2063; B01D 2255/407; B01D 2255/9155; B01D 2255/9205; B01D 2258/014; B01D 53/945; B01D 53/86; Y02T 10/12; B01J 23/40; B01J 23/63; B01J 37/0248; B01J 37/0219; B01J 23/464
See application file for complete search history.

(56) References Cited

U.S. PATENT DOCUMENTS

| | | |
|---|---|---|
| 10,625,243 B2 | 4/2020 | Clowes |
| 2003/0140620 A1* | 7/2003 | Shigapov ............. F01N 3/0231 60/299 |
| 2009/0193796 A1 | 8/2009 | Wei et al. |
| 2018/0021756 A1 | 1/2018 | Karpov |
| 2018/0266289 A1* | 9/2018 | Otsuka ................. F01N 3/0222 |
| 2018/0298800 A1* | 10/2018 | Clowes ................. F01N 3/023 |
| 2019/0168162 A1 | 6/2019 | Nikolaevich |
| 2020/0156054 A1 | 5/2020 | Mahon |
| 2020/0316568 A1* | 10/2020 | Fisher ...................... B01J 35/40 |
| 2020/0353410 A1 | 11/2020 | Waltz |

FOREIGN PATENT DOCUMENTS

| | | |
|---|---|---|
| EP | 2 436 441 A1 | 4/2012 |
| WO | 1999047260 A1 | 9/1999 |
| WO | 2017056067 A1 | 4/2017 |
| WO | 2020219376 A1 | 10/2020 |
| WO | 2020/263806 A1 | 12/2020 |

* cited by examiner

*Primary Examiner* — Brandon D Lee

(57) ABSTRACT

A method for the manufacture of a Gasoline Particulate Filter is disclosed. The method comprises forming a washcoat slurry, coating a wall-flow filter substrate with the washcoat slurry to form a washcoated substrate, and calcining the washcoated substrate to form a Gasoline Particulate Filter. The washcoat slurry comprises a platinum group metal component consisting of Pt and Rh, an oxygen storage capacity material, and a carboxylate ion.

19 Claims, No Drawings

METHOD FOR PRODUCING GASOLINE PARTICULATE FILTER

TECHNICAL FIELD

The present invention relates to a method of providing a catalytic wall-flow filter suitable for use in a vehicular automobile emission treatment system, in particular an emission treatment system for a positive ignition internal combustion engine, such as a gasoline spark ignition engine. In particular, the present invention provides a method for producing a catalytic wall-flow filter with improved catalytic activity and reduced back pressure.

BACKGROUND OF THE INVENTION

Gasoline particulate filters (GPF) are an emission aftertreatment technology developed to control particulate emissions from gasoline direct injection (GDI) engines.

The population of GDI vehicles has been increasing, driven by $CO_2$ and/or fuel economy requirements. In 2016, an estimated 60% of new gasoline cars in Europe were GDI.

The proportion of GDI vehicles has been also rapidly increasing in North America—within nine years after its first significant use in the market, GDI penetration has climbed to 48.5% of new light vehicle sales in the United States. Emissions from the growing GDI vehicle fleet are a public health concern and a potential major source of ambient particle pollution in highly populated urban areas.

Most early GPF applications included an uncoated GPF positioned downstream of a three-way catalyst (TWC). As the technology matured, GPFs have been also coated with a three-way catalyst. This catalyst-coated GPF configuration is sometimes referred to as the four-way catalyst. However, the combination of the TWC coating on a filter body does introduce additional issues such as undue back-pressure, and there are requirements for minimum CO, NOx and HC conversion properties. In addition, there are cost considerations with a need to provide the best possible balance of performance to cost.

Three-way catalysts are intended to catalyze three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust gas from an engine running at or about the stoichiometric point. As is well known in the art, the quantity of carbon monoxide (CO), unburned hydrocarbons (HC) and nitrogen oxides (NOx) emitted when gasoline fuel is combusted in a positive ignition (e.g., spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces this stoichiometrically balanced exhaust gas composition is typically given as 14.7:1.

The active components in a typical TWC comprise one or both of platinum and palladium in combination with rhodium, or even palladium only (no rhodium), supported on a high surface area oxide, and an oxygen storage capacity (OSC) material.

Theoretically, it should be possible to achieve complete conversion of $O_2$, $NO_x$, CO and HC in a stoichiometrically balanced exhaust gas composition to $CO_2$, $H_2O$ and $N_2$ (and residual $O_2$) and this is the duty of the TWC. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda ($\lambda$) value of the exhaust gas, which can be defined according to the following equation:

$$\mathrm{lambda}(\lambda)=(\text{actual engine air-to-fuel ratio})/(\text{stoichiometric air-to-fuel ratio})$$

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates.

It should be appreciated that the reduction of $NO_x$ to $N_2$ using a TWC is less efficient when the exhaust gas composition is lean or stoichiometric. Equally, the TWC is less able to oxidize CO and HC when the exhaust gas composition is rich. The challenge, therefore, is to maintain the composition of the exhaust gas flowing into the TWC at as close to the stoichiometric composition as possible. Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

When the exhaust gas composition is slightly rich of the set point, there is a need for a small amount of oxygen to consume the unreacted CO and HC, i.e., to make the reaction more stoichiometric. Conversely, when the exhaust gas goes slightly lean, the excess oxygen needs to be consumed. This was achieved by the development of OSC material that liberates or absorbs oxygen during the perturbations. The most commonly used OSC material in modern TWCs is cerium oxide ($CeO_2$) or a mixed oxide containing cerium, e.g., a Ce/Zr mixed oxide.

It is an object of the invention to provide an improved method producing a GPF, to tackle problems associated with the prior art and/or to at least provide a commercially viable alternative thereto.

SUMMARY OF THE INVENTION

One aspect of the present disclosure is directed to a method for the manufacture of a Gasoline Particulate Filter (GPF), the method comprising: (i) forming a washcoat slurry; (ii) coating a wall-flow filter substrate with the washcoat slurry to form a washcoated substrate; and (iii) calcining the washcoated substrate to form a GPF, wherein the washcoat slurry comprises (a) a platinum group metal (PGM) component consisting of Pt and Rh; (b) an oxygen storage capacity (OSC) material; and (c) a carboxylate ion.

Another aspect of the present disclosure is directed to a pre-calcined GPF precursor comprising a washcoated wall-flow filter substrate that comprises a washcoat, wherein the washcoat comprises: (a) a platinum group metal (PGM) component consisting of Pt and Rh; (b) an oxygen storage capacity (OSC) material; and (c) a carboxylate ion.

Another aspect of the present disclosure is directed to a method for the manufacture of a gasoline combustion and exhaust gas handling system, the method comprising: (a) providing a gasoline engine having an exhaust manifold; (b) manufacturing a GPF according to the method described herein; and (c) forming an exhaust gas treatment system comprising the GPF and connecting the exhaust gas treatment system to the exhaust manifold of the gasoline engine.

DETAILED DESCRIPTION OF THE INVENTION

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

One aspect of the present disclosure is directed to a method for the manufacture of a Gasoline Particulate Filter (GPF), the method comprising: (i) forming a washcoat slurry; (ii) coating a wall-flow filter substrate with the washcoat slurry to form a washcoated substrate; and (iii) calcining the washcoated substrate to form a GPF, wherein the washcoat slurry comprises (a) a platinum group metal (PGM) component consisting of Pt and Rh; (b) an oxygen storage capacity (OSC) material; and (c) a carboxylate ion.

The method comprises a step of forming a washcoat slurry. The washcoat slurry comprises a platinum group metal (PGM) component consisting of Pt and Rh. Suitable precursors of Pt and Rh include salts containing these metals, e.g., platinum nitrate and rhodium nitrate.

The amount of the PGM (i.e., Pt and Rh in total) in the washcoat slurry can be from 0.005 to 10 wt %, preferably from 0.001 to 5 wt %, more preferably from 0.05 to 3.0 wt %, relative to the total weight of the washcoat slurry.

The weight ratio of Pt to Rh may be from 1:10 to 10:1, preferably from 1:2 to 2:1.

The washcoat slurry does not comprise any other PGM. In particular, the washcoat slurry does not contain any Pd.

The washcoat slurry comprises an oxygen storage capacity (OSC) material. "Oxygen storage capacity" refers to the ability of materials used as oxygen storage capacity material in catalysts to store oxygen at lean conditions and to release it at rich conditions.

The OSC material can be ceria or a mixed oxide comprising ceria. Preferably the OSC material comprises a mixed oxide of cerium, zirconium; a mixed oxide of cerium, zirconium, and aluminium; a mixed oxide of cerium, zirconium, and neodymium; or a mixed oxide of cerium, zirconium and praseodymium. The term "mixed oxide" as used herein generally refers to a mixture of oxides in a single phase, as is conventionally known in the art.

The amount of the OSC material in the washcoat slurry can be from 5 to 50 wt %, preferably from 10 to 30 wt %, relative to the total weight of the washcoat slurry.

The washcoat slurry comprises a carboxylate ion. Preferably the carboxylate ion is selected from the group consisting of citrate, malate, malonate, succinate, tartrate, glutarate, tartronate, oxalate, lactate and glycolate ions, and mixtures thereof, more preferably citrate, malate, malonate, succinate, tartrate, glutarate, tartronate and oxalate ions, and mixtures thereof, and even more preferably citrate and/or malonate ions. Citrate ions are most preferred.

Preferably the molar ratio of carboxylate ions to Pt ions in the washcoat slurry is from 1:1 to 100:1, more preferably from 5:1 to 50:1, most preferably from 10:1 to 25:1.

Preferably the washcoat slurry is substantially devoid of Ba. The inventors have found that, unlike in a GPF containing Pd and Rh, the inclusion of Ba ions has a detrimental effect on the performance of a GPF containing Pt and Rh. That is, surprisingly, removing the Ba improves the TWC effects of the GPF.

The washcoat slurry can further comprise an inorganic oxide support. The inorganic oxide support can be an oxide of Groups 2, 3, 4, 5, 13 and 14 elements. The inorganic oxide support is preferably a refractory oxide that exhibits chemical and physical stability at high temperatures, such as the temperatures associated with gasoline engine exhaust. The inorganic oxide support can be selected from the group consisting of alumina, silica, titania, and mixed oxides or composite oxides thereof. More preferably, the inorganic oxide support is an alumina.

The inorganic oxide support can be doped with a dopant. The dopant can be selected from the group consisting of La, Sr, Si, Ba, Y, Pr, Nd, Ce, and mixtures thereof. Preferably, the dopant is La, Ba, or Ce. Most preferably, the dopant is La. The dopant content in the inorganic oxide support can be from 1 to 30 wt %, preferably from 2 to 25 wt %, more preferably from 3 to 20 wt %.

The OSC material and the inorganic oxide support in the washcoat slurry can have a weight ratio of from 10:1 to 1:10, preferably from 5:1 to 1:5; more preferably from 3:1 to 1:3.

The washcoat slurry typically contains water as a solvent. Other solvents or mixtures of water and other solvents such as alcohols may be used.

The washcoat slurry typically has a solid content of from 15 to 40%, more preferably 20 to 35%, by weight.

The method further comprises coating a wall-flow filter substrate with the washcoat slurry to form a washcoated substrate.

The wall-flow filter substrates are well known in the art. The wall-flow filter substrate has a first face and a second face defining a longitudinal direction therebetween and first and second pluralities of channels extending in the longitudinal direction. The first plurality of channels is open at the first face and closed at the second face and the channels of the first plurality of channels are defined in part by channel wall surfaces. The second plurality of channels is open at the second face and closed at the first face and the channels of the second plurality of channels are defined in part by channel wall surfaces. The channel walls between the channel wall surfaces of the first plurality of channels and the channel wall surfaces of the second plurality of channels are porous.

The wall-flow filter substrate can be a ceramic, e.g., silicon carbide, cordierite, aluminium nitride, silicon nitride, aluminium titanate, alumina, mullite, pollucite, or composites comprising segments of any two or more thereof. Cordierite, a magnesium aluminosilicate, and silicon carbide are particularly preferred.

The wall-flow filter substrate suitable for use in the present invention typically has a mean pore size of from 8 to 45 μm, for example 8 to 25 μm, 10 to 20 μm, or 10 to 15 μm. Pore size is well known in the art and appropriate measurement techniques are known to the person skilled in the art. The wall-flow filter substrate may have a porosity of 40 to 75%, such as 45 to 70% or 50 to 65%. The mean pore size may be determined using mercury porosimetry and x-ray tomography according to conventional methods.

Coating may be performed by spraying and/or dipping the wall-flow filter substrate. Preferably the coating is applied to at least one of the inlet channels and the outlet channels of the wall-flow filter substrate. More preferably the coating is applied to both the inlet and the outlet channels. One suitable coating procedure is described in WO1999047260.

The method further comprises calcining the washcoated substrate to form a GPF. Calcining may be preceded by a drying step at a lower temperature (such as 100 to 200° C.). Calcining is routine in the art and may be performed under usual conditions.

After the calcination, the Pt loading in the GPF is generally from 1 g/ft$^3$ to 50 g/ft$^3$, more preferably 2 g/ft$^3$ to 20 g/ft$^3$. The Rh loading in the GPF is generally from 1 g/ft$^3$ to 50 g/ft$^3$, more preferably 2 g/ft$^3$ to 20 g/ft$^3$. The washcoat loading of the GPF, after calcination, is typically from 0.2 g/in$^3$ to 5 g/in$^3$, more preferably 0.5 g/in$^3$ to 3 g/in$^3$ It is known that both Pt and Pd have catalytic activity for remediating components in an exhaust gas. Furthermore, it has been the case that Pd has in recent years become much more expensive than Pt. Indeed, at the time of drafting this application, the price of Pd is generally 2 to 3 times more than that of Pt. Accordingly, there is a drive to reduce the amount of Pd used in catalyst devices.

The use of Pt is generally perceived to be less effective. Indeed, Pt has less activity when swapped with Pd, due to having fewer active sites. Pt atom weight is almost two times that of Pd, so in a given weight of PGM the molar amount of Pt is only about half of that of Pd. Pt also is known to have weak thermal stability due to its high volatile pressure compared to Pd at high temperature. This is particularly important for a GPF compared to components used in Diesel engine exhaust systems, since the temperatures encountered are generally higher. This is also important in filters, compared to flow-through substrates, since there are intermittent high temperature regeneration steps used to burn off accumulated particulate matter.

The inventors have found that provided certain additional steps are taken, these disadvantages can be overcome and a GPF containing Pt and Rh can be produced that even may have better performance than a GPF containing Pd and Rh. In particular, the inventors have found that the inclusion of carboxylate ions, e.g., added as carboxylic acids or suitable alkali or alkaline earth metal salts in the washcoat slurry, provides a GPF having improved catalytic performance and reduced back pressure. Without wishing to be bound by theory it is considered that the promoted Pt performance may be a consequence of the carboxylate generating more porosity in the coated filter. It is noted that there is also an incremented improvement in the OSC performance.

Another aspect of the present disclosure is directed to a pre-calcined GPF precursor comprising a washcoated wall-flow filter substrate that comprises a washcoat, wherein the washcoat comprises: (a) a platinum group metal (PGM) component consisting of Pt and Rh; (b) an oxygen storage capacity (OSC) material; and (c) a carboxylate ion.

The pre-calcined precursor may be obtained by the method described herein without calcination. Accordingly, all aspects of the method described herein apply. The pre-calcined precursor of course contains the carboxylate ions which would otherwise be burned out in the calcining process. Preferably the molar ratio of carboxylate ions to Pt ions in the washcoat of pre-calcined GPF precursor is from 1:1 to 100:1, more preferably from 5:1 to 50:1, most preferably from 10:1 to 25:1.

According to a further aspect there is provided a method for the manufacture of a gasoline combustion and exhaust gas handling system, the method comprising: (a) providing a gasoline engine having an exhaust manifold; (b) manufacturing a GPF according to the method described herein; and (c) manufacturing an exhaust gas treatment system comprising the GPF and connecting the exhaust gas treatment system to the exhaust manifold.

Example 1

Cold Flow Back Pressure Testing

Comparative Catalyst A

A washcoat slurry containing Pd and Rh supported on a cerium-zirconium mixed oxide and a La-stabilized alumina, Ba promoter, and water was prepared. The washcoat slurry was coated from both the inlet and outlet face of a cordierite wall-flow honeycomb filter substrate (132.1 mm×127 mm; 300 cells per square inch; wall thickness 12 thousandths of an inch; mean pore size 19 μm; porosity 63%) using a coating procedure described in WO1999047260A1. The coating lengths on the inlet channels and the outlet channels are both about 55% of the substrate length. The coated substrate was dried at 90° C., and calcined at 500° C. for 45 min to produce the GPF. The GPF thus produced has a washcoat loading of 1.6 g/in$^3$, Pd loading of 4 g/ft$^3$, Rh loading was 4 g/ft$^3$, and Ba loading of 133 g/ft$^3$.

Catalyst B

Catalyst B is prepared according to the similar procedure as that for preparing Comparative Catalyst A, except that the washcoat slurry does not contain Ba promoter. In addition, the washcoat contains Pt instead of Pd. Furthermore, the washcoat slurry contains citric acid. The coated substrate contains citric acid at a loading 100 g/ft$^3$ after the coated substrate is dried but not calcined. The GPF produced after calcination has a washcoat loading of 1.6 g/in$^3$, Pt loading of 4 g/ft$^3$, and Rh loading of 4 g/ft$^3$.

The cold flow back pressure (BP) of the fresh Catalysts B and fresh Comparative Catalyst A are shown in Table 1. The data show that Catalyst B gave a 11% lower back pressure at a flow rate of 600 m$^3$/h when compared with Comparative Catalyst A. The BP contribution compared with the bare filter substrate is calculated as (BP of coated part−BP bare substrate)/(BP of the bare substrate). The BP contribution of Catalyst B was 16% lower than that of Comparative Catalyst A.

TABLE 1

Cold Flow Back Pressure Test

|  | Back Pressure (mbar) @ 600 m³/h | BP contribution (%) |
|---|---|---|
| Comparative Catalyst A | 45 | 41 |
| Catalysts B | 40 | 25 |
| Bare filter substrate | 32.3 | — |

Example 2

Light Off Performance and OSC Test in Engine Bench Testing

Catalysts B and Comparative Catalyst A as GPF bricks were bench aged under 6.1-L engine with four mode aging cycle, with peak bed temperature of the front TWC brick at approximately 980° C., followed by a rear GPF brick during the aging at maximum bed temperature in the GPF of approximately 960° C. The aging duration was 200 h, which simulates 200,000 km durability test in a real application.

The bench aged Catalyst B and Comparative Catalyst A were tested separately over a gasoline engine. The light off performance was a typical condition with the exhaust gas flow rate of 80 kg/h. The temperature ramp rate was 30° C./min. The lambda of Air and Fuel Ratio (AFR) was at 14.45. THC, CO, $NO_x$ conversions were calculated by comparing the compositions of the feed gas and the outlet gas.

The HC, CO and $NO_x$ $T_{50}$ light off temperatures ($T_{50}$ is the temperature when the conversion reaching 50%) of Catalyst B and Comparative Catalyst A are shown in Table 2. The data show that Catalyst B gave improved light off performances for HC, CO and $NO_x$. T50 of HC, CO and $NO_x$ of Catalyst B are 29, 39, 33° C. lower respectively as compared with those of Comparative Catalyst A. The oxygen storage capacity (OSC) testing was carried out on engine bench over the bench aged parts under testing conditions of the flow rate of 125 kg/h and catalyst inlet temperature of 550° C. with Lambda amplitude 6.8% at 15 second switch. Catalyst B exhibits slightly higher OSC compared with Comparative Catalyst A as shown in Table 2.

TABLE 2

Bench Testing Results of Light Off and OSC Over the Bench Aged Parts

|  | T50 of CO (° C.) | T50 of THC (° C.) | T50 of NOx (° C.) | OSC at 550° C. (mg)/pc |
|---|---|---|---|---|
| Comparative Catalyst A | 445 | 439 | 411 | 201 |
| Catalyst-B | 406 | 410 | 378 | 227 |

Example 3

Vehicle Testing

The bench aged samples of Catalyst B and Comparative Catalyst A as GPF parts were tested over a vehicle of 1.5-liter engine with Worldwide Light Duty Testing Procedure (WLTP) respectively, with the same aged TWC sample placed in close coupled position and the GPF part placed in underfloor position in the aftertreatment system. Results of vehicle exhaust diluted bag data over those bench aged parts are shown in Table 3. Catalyst B gave equivalent activities on THC, CO and $NO_x$ emission control compared with Comparative Catalyst A according to the vehicle testing results.

TABLE 3

Results of Emissions by Vehicle Diluted Bag Data

|  | Exhaust Emissions (mg/km) | | | |
|---|---|---|---|---|
|  | THC | NMHC | CO/10 | $NO_x$ |
| Comparative Catalyst A | 40.4 | 29.5 | 43.3 | 33.3 |
| Catalyst B | 39.9 | 29.8 | 37.5 | 33.9 |

Example 4

Bench Lambda Sweep Testing

Comparative Catalyst C

Comparative Catalyst C was prepared in the similar manner as Comparative Catalyst A, except that that the washcoat slurry contains Pt instead of Pd. The GPF obtained after calcination has a washcoat loading of 1.6 g/in³, Pt loading of 6 g/ft³, Rh loading of 4 g/ft³, and Ba loading of 133 g/ft³.

Catalyst D

Catalyst D was prepared according to the similar procedure as that for Catalyst B except that the washcoat slurry contains different amount of Pt. The GPF obtained after calcination has a washcoat loading of 1.6 g/in³, Pt loading of 6 g/ft³, and Rh loading of 4 g/ft³.

Catalysts D and Comparative Catalyst C were bench aged under 6.1-L engine in the same run for 200 h with four mode aging cycle, with peak bed temperature at about 960° C. in the catalysts.

Lambda sweep testing was carried out on the engine bench by adjusting Fuel/Air ratio at 400° C. at a flow rate of 80 kg/h. THC, CO and $NO_x$ conversions of the bench aged Catalysts D and Comparative Catalyst C are shown in Tables 4, 5, and 6. The data show that Catalyst D gave higher conversions of THC, CO and $NO_x$ at rich conditions with lambda less than 1.

TABLE 4

$NO_x$ Conversion

|  | $NO_x$ conversion (%) | | |
|---|---|---|---|
|  | Lambda = 1.003 | Lambda = 0.998 | Lambda = 0.980 |
| Comparative Catalyst C | 83.8 | 93.5 | 65.3 |
| Catalyst D | 84.7 | 97.4 | 82.2 |

TABLE 5

THC Conversion

|  | THC conversion (%) | | |
|---|---|---|---|
|  | Lambda = 1.003 | Lambda = 0.998 | Lambda = 0.980 |
| Comparative Catalyst C | 93.8 | 79.4 | 29.2 |
| Catalyst D | 95.2 | 82.9 | 37.6 |

TABLE 6

| | CO Conversion | | |
|---|---|---|---|
| | CO conversion (%) | | |
| | Lambda = 1.003 | Lambda = 0.998 | Lambda = 0.980 |
| Comparative Catalyst C | 74.3 | 65.9 | 29.4 |
| Catalyst D | 77.2 | 73.3 | 40.5 |

Example 5

Cold Flow Back Pressure Test

Comparative Catalyst E

Comparative Catalyst E was prepared according to the similar procedure as that for preparing Comparative Catalyst A, except that the washcoat slurry contains Pt instead of Pd and the washcoat slurry contain no Ba promoter. The GPF produced after calcination has a washcoat loading of 1.6 g/in$^3$, Pt loading of 4 g/ft$^3$, and Rh loading of 4 g/ft$^3$.

Catalyst F

Catalyst F was prepared according to the similar procedure as that for Comparative Catalyst E except that the washcoat slurry contained citric acid. A pre-calcined GPF precursor produced has citric acid loading of 50 g/ft$^3$. The GPF produced after calcination has a washcoat loading of 1.6 g/in$^3$, Pt loading of 4 g/ft$^3$, and Rh loading of 4 g/ft$^3$.

Catalyst G

Catalyst G was prepared according to the similar procedure as that for Comparative Catalyst E except that the washcoat slurry contained citric acid. A pre-calcined GPF precursor produced has citric acid loading of 75 g/ft$^3$. The GPF produced after calcination has a washcoat loading of 1.6 g/in$^3$, Pt loading of 4 g/ft$^3$, and Rh loading of 4 g/ft$^3$.

Catalyst H:

Catalyst H was prepared according to the similar procedure as that for Comparative Catalyst E except that the washcoat slurry contained citric acid. A pre-calcined GPF precursor produced has citric acid loading of 100 g/ft$^3$. The GPF produced after calcination has a washcoat loading of 1.6 g/in$^3$, Pt loading of 4 g/ft$^3$, and Rh loading of 4 g/ft$^3$.

The cold flow back pressure of calcined Catalyst H, Catalyst G, Catalyst F and Comparative Catalyst E are shown in Table 7. The data shows that Catalyst H gave lowest back pressure results at flow rate of 200, 300, 400 and 600 m$^3$/h, respectively, when compared with Catalysts G, Catalysts F and Comparative Catalyst E. Table 7 shows that BP decreases as the amount of citric acid in the washcoat slurry increases.

TABLE 7

| | Cold Flow Back Pressure Test | | | |
|---|---|---|---|---|
| | BP (mbar) @ different flow rate | | | |
| | 200 m$^3$/h | 300 m$^3$/h | 400 m$^3$/h | 600 m$^3$/h |
| Comparative Catalyst E | 9 | 15 | 23 | 42 |
| Catalyst F | 8.4 | 14.5 | 21.9 | 40.5 |
| Catalyst G | 8.1 | 14 | 21.2 | 39.4 |
| Catalyst H | 7.6 | 13.4 | 20.5 | 38.6 |

As used herein, the singular form of "a", "an" and "the" include plural references unless the context clearly dictates otherwise.

The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. A method for the manufacture of a Gasoline Particulate Filter (GPF), the method comprising:
    (i) forming a washcoat slurry;
    (ii) coating a wall-flow filter substrate with the washcoat slurry to form a washcoated substrate; and
    (iii) calcining the washcoated substrate to form the GPF, wherein the washcoat slurry comprises
        (a) a platinum group metal (PGM) component consisting of Pt and Rh;
        (b) an oxygen storage capacity (OSC) material that is ceria or a mixed oxide comprising ceria; and
        (c) a carboxylate ion.

2. The method according to claim 1, wherein the carboxylate ion is selected from the group consisting of citrate, malate, malonate, succinate, tartrate, glutarate, tartronate, oxalate, lactate, glycolate ions, and mixtures thereof.

3. The method according to claim 1, wherein the carboxylate ion is selected from the group consisting of citrate, malonate ions, and mixtures thereof.

4. The method according to claim 1, wherein the carboxylate ion is citrate ion.

5. The method according to claim 1, wherein the washcoat slurry comprises the carboxylate ion to Pt in a molar ratio of from 1:1 to 100:1.

6. The method according to claim 1, wherein the washcoat slurry comprises the carboxylate ion to Pt in a molar ratio of from 5:1 to 50:1.

7. The method according to claim 1, wherein the washcoat slurry comprises the carboxylate ion to Pt in a molar ratio of from 10:1 to 25:1.

8. The method according to claim 1, wherein the washcoat slurry is substantially devoid of Ba.

9. The method according to claim 1, wherein the washcoat slurry further comprises an inorganic oxide support that comprises alumina.

10. The method according to claim 1, wherein the washcoat slurry is coated on inlet channels and outlet channels of the wall-flow filter substrate.

11. A pre-calcined Gasoline Particulate Filter precursor comprising a washcoated wall-flow filter substrate that comprises a washcoat, wherein the washcoat comprises:
    (a) a platinum group metal (PGM) component consisting of Pt and Rh;
    (b) an oxygen storage capacity (OSC) material that is ceria or a mixed oxide comprising ceria; and
    (c) a carboxylate ion.

12. The pre-calcined Gasoline Particulate Filter precursor according to claim 11, wherein the carboxylate ion is selected from the group consisting of citrate, malate, malonate, succinate, tartrate, glutarate, tartronate, oxalate, lactate, glycolate ions, and mixtures thereof.

13. The pre-calcined Gasoline Particulate Filter precursor according to claim 11, wherein the carboxylate ion is selected from the group consisting of citrate, malonate ions, and mixtures thereof.

14. The pre-calcined Gasoline Particulate Filter precursor according to claim 11, wherein the carboxylate ion is citrate ion.

15. The pre-calcined Gasoline Particulate Filter precursor according to claim 11, wherein the washcoat comprises the carboxylate ion to Pt in a molar ratio of from 1:1 to 100:1.

16. The pre-calcined Gasoline Particulate Filter precursor according to claim 11, wherein the washcoat comprises the carboxylate ion to Pt in a molar ratio of from 5:1 to 50:1.

17. The pre-calcined Gasoline Particulate Filter precursor according to claim 11, wherein the washcoat is substantially devoid of Ba.

18. The pre-calcined Gasoline Particulate Filter precursor according to claim 11, wherein the washcoat further comprises an inorganic oxide support that comprises alumina.

19. A method for the manufacture of a gasoline combustion and exhaust gas handling system, the method comprising:
   (a) providing a gasoline engine having an exhaust manifold;
   (b) manufacturing a Gasoline Particulate Filler according to the method of claim 1;
   (c) forming an exhaust gas treatment system comprising the Gasoline Particulate Filter and connecting exhaust gas treatment system to the exhaust manifold of the gasoline engine.

* * * * *